US007330170B2

(12) United States Patent
Hwang

(10) Patent No.: US 7,330,170 B2
(45) Date of Patent: Feb. 12, 2008

(54) DRIVER CIRCUIT FOR LIQUID CRYSTAL PANEL AND LCD USING THE SAME

(75) Inventor: Gi-soon Hwang, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 551 days.

(21) Appl. No.: 10/780,922

(22) Filed: Feb. 17, 2004

(65) Prior Publication Data

US 2004/0160408 A1 Aug. 19, 2004

(30) Foreign Application Priority Data

Feb. 17, 2003 (KR) ...................... 10-2003-0009845

(51) Int. Cl.
*G09G 3/36* (2006.01)
*G06F 3/38* (2006.01)

(52) U.S. Cl. ........................... 345/98; 345/87; 345/212

(58) Field of Classification Search .......... 345/55-100, 345/204-214
See application file for complete search history.

(56) References Cited

U.S. PATENT DOCUMENTS 6,587,101 B2 * 7/2003 Yoo ........................... 345/211
2003/0020677 A1 * 1/2003 Nakano ........................ 345/87
2003/0043140 A1 * 3/2003 Ko et al. ..................... 345/211
2004/0257319 A1 * 12/2004 Park et al. ..................... 345/87

FOREIGN PATENT DOCUMENTS

JP 2002-258811 A 9/2002
KR 1998-3967 A 3/1998
KR 2002-25543 A 4/2002

OTHER PUBLICATIONS

PCT International Search Report; International Application No. PCT/KR2004/000149; International Filing Date: Jan. 29, 2004; Date of Maililng May 18, 2004.

* cited by examiner

*Primary Examiner*—David L. Lewis
(74) *Attorney, Agent, or Firm*—Cantor Colburn LLP

(57) ABSTRACT

Disclosed herein is a driver circuit for a liquid crystal panel and liquid crystal display using the same. The driver circuit includes a gate and data driving units, a determination unit, and a switching unit. The gate and data driving units apply signal voltages to gate and data lines of a liquid crystal panel. The determination unit determines whether horizontal or vertical synchronization signals are input from the outside, and performs a normal mode or power saving mode depending upon determination results. The switching unit shuts off power to the data and gate driving units depending upon the determination results.

24 Claims, 2 Drawing Sheets

DRIVER CIRCUIT FOR LIQUID CRYSTAL PANEL AND LCD USING THE SAME

This application claims the priority of Korean Patent Application No. 10-2003-0009845 filed on Feb. 17, 2003 in the Korean Intellectual Property Office, the disclosure of which is incorporated herein in its entirety by reference.

BACKGROUND OF THE INVENTION

1. Field of the Invention

The present invention relates generally to a driver circuit for a liquid crystal panel and LCD using the same, and more particularly to a driver circuit for a liquid crystal panel and LCD using the same, which can reduce unnecessary power consumption by shutting off power to the liquid crystal panel during a power saving mode.

2. Description of the Related Art

Recently, there is widely used a Thin Film Transistor-Liquid Crystal Display (TFT-LCD) that is lightweight, is small-sized and can implement full colors and high resolution compared to a Cathode Ray Tube (CRT) type display. Such TFT-LCDs are the display devices that exploit an optical characteristic of liquid crystals in which the molecular arrangement thereof is changed by an electric field, and are used as units for performing a display function in systems, such as notebook computers, televisions and monitors.

As shown in FIG. 1, a TFT-LCD 10 includes a backlight 20 having a light source, a liquid crystal panel 30 formed by injecting liquid crystals between combined upper and lower substrates, and a driver circuit 40 having data and gate driving unit 41 and 42 for driving the liquid crystal panel 30 and a timing controller 43 for generating control signals to control the driving units 41 and 42.

Although a TFT-LCD monitor to which the above-described TFT-LCD 10 is applied can use digital signals output from a computer body without conversion, an Analog Digital Converter (ADC) for converting analog signals into digital signals is employed to be compatible with existing graphic cards because most graphic cards currently use the way of converting digital signals output from the computer body into analog signals and outputting the converted analog signals.

However, since the conventional TFT-LCD monitor should be additionally equipped with the ADC and the like, the manufacturing costs thereof are increased. Additionally, since the processes of converting digital signals output from the computer body into analog signals in a graphic card and converting the converted analog signals into digital signals should be undergone, the conventional TFT-LCD monitor is problematic in that the distortion of screens may be caused by a signal loss and noise generated during the signal conversion processes.

In order to solve the problem, demands for digital type TFT-LCD monitors using digital signals output from a computer body without conversion are increased, and it is expected that the trend toward the increased demands will be further increased due to the popularization of graphic cards.

However, since the above-described conventional digital type TFT-LCD monitor is constructed so that power is supplied to a liquid crystal panel in a power saving mode, the conventional digital type TFT-LCD monitor is problematic in that power consumption is great, so that it is difficult to satisfy the Display Power Management System (DPMS) standard.

Additionally, the above-described digital type TFT-LCD monitor reduces unnecessary power consumption by blanking image being displayed so as to prevent a user from recognizing the input of an abnormal image signal when the abnormal image signal is input from a computer body. However, since the liquid crystal panel is still supplied with power during a blanking period, the conventional digital type TFT-LCD monitor is disadvantageous in that power consumption during the blanking period is the same as that during a normal operation.

SUMMARY

Accordingly, the present invention has been made keeping in mind the above problems occurring in the prior art, and an object of the present invention is to provide a driver circuit for a liquid crystal panel and a LCD using the same, which performs a normal mode or power saving mode depending on whether horizontal or vertical synchronization signals are input from the outside and shuts off power supplied to the liquid crystal panel during the power consumption mode, thus reducing power consumption during the power saving mode and satisfying the DPMS standard.

Another object of the present invention is to provide a driver circuit for a liquid crystal panel and LCD using the same, which shuts off power supplied to the liquid crystal panel when an abnormal signal is input, thus preventing power from being unnecessarily consumed.

In order to accomplish the above object, the present invention provides a driver circuit for a liquid crystal panel, including gate and data driving units for applying signal voltages to gate and data lines of a liquid crystal panel, a determination unit for determining whether horizontal or vertical synchronization signals are input from an outside and performing a normal mode or power saving mode depending upon determination results, and a switching unit for shutting off power to the data and gate driving units depending upon the determination results.

In addition, the present invention provides a liquid crystal display, including a backlight having a light source; a liquid crystal panel on which a plurality of thin film transistors are formed on intersections of a plurality of data and gate lines, and a driver circuit for driving the liquid crystal panel, the driver circuit including gate and data driving units for applying signal voltages to gate and data lines of a liquid crystal panel, a determination unit for determining whether horizontal or vertical synchronization signals are input from an outside and performing a normal mode or power saving mode depending upon determination results, and a switching unit for shutting off power to the data and gate driving units depending upon the determination results.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
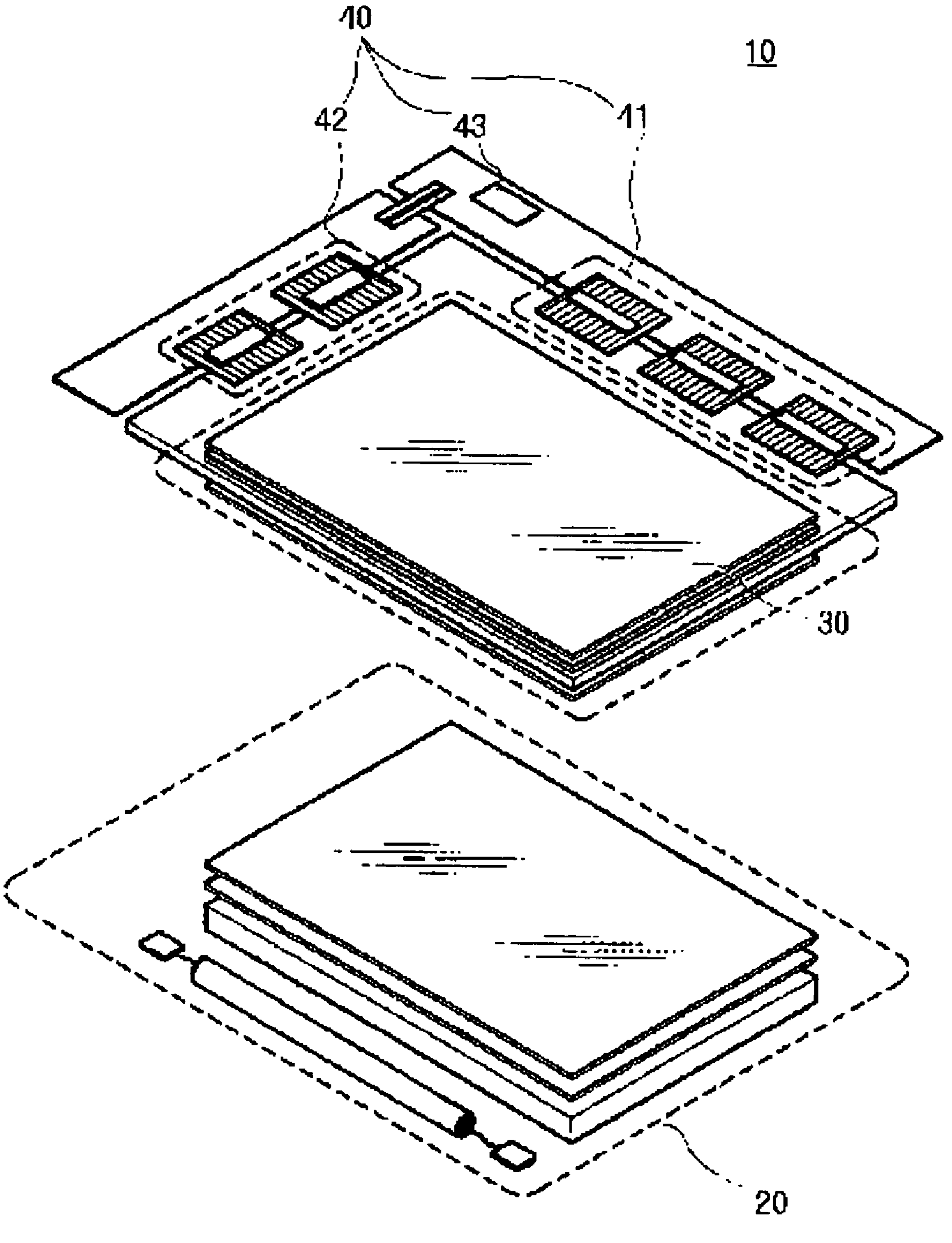
FIG. 1 is a schematic perspective view of a conventional LCD.

Reference now should be made to the drawings, in which the same reference numerals are used throughout the different drawings to designate the same or similar components.

Figure 2:
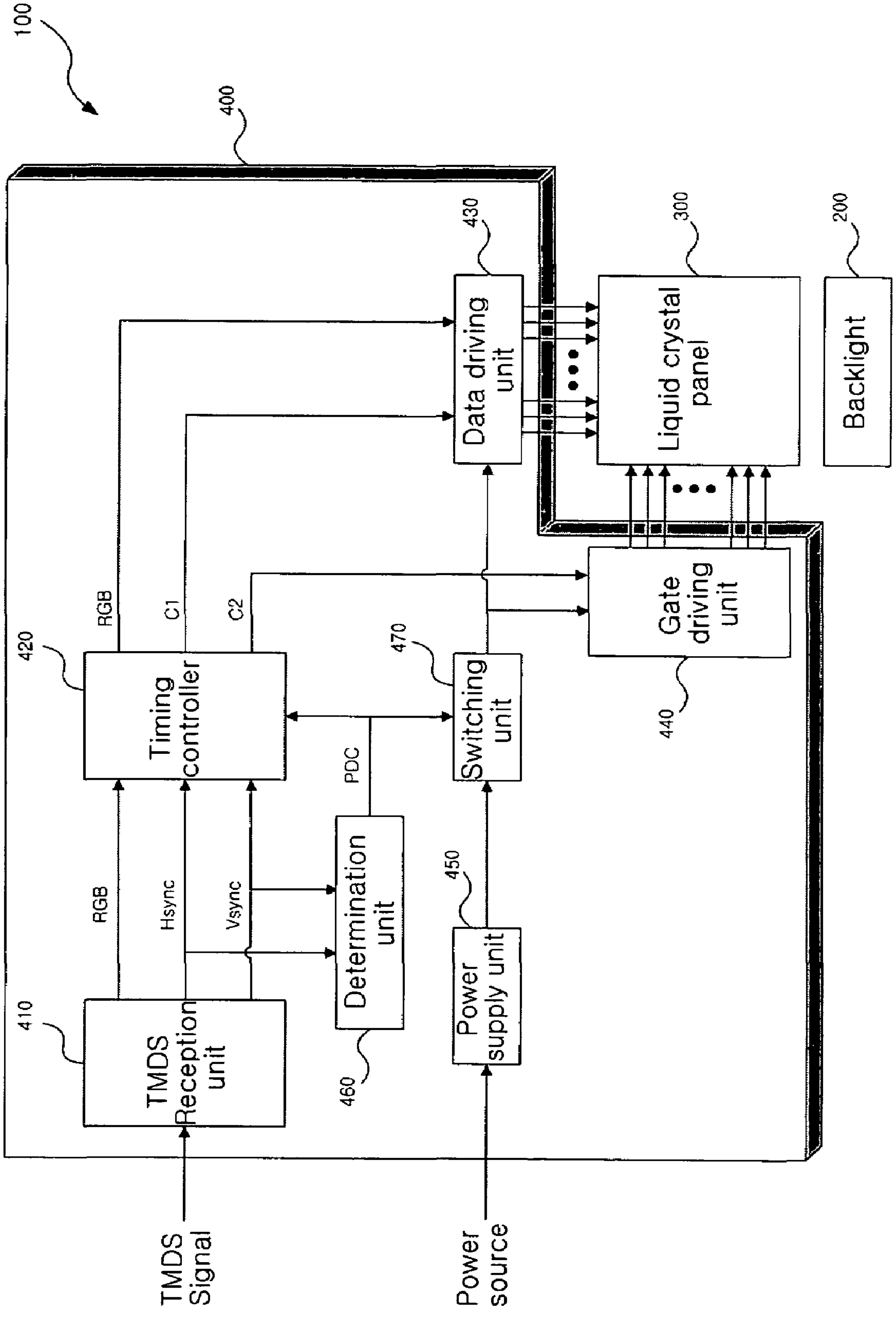
FIG. 2 is a block diagram of a LCD according to the present invention.

FIG. 2 is a block diagram of a LCD according to the present invention. As shown in FIG. 2, a LCD 100 of the present invention includes a backlight having a light source, a liquid crystal panel 300 having a plurality of pixels, and a driver circuit 400 for driving the liquid crystal panel 300.

The backlight 200 generates planar light having uniform brightness through the use of a fluorescent lamp used as a light source and irradiates the planer light all over the liquid crystal panel 300. Since the liquid crystal panel 300 does not emit light by itself and cannot be used at places without light, light is irradiated to the entire liquid crystal panel 300 from the back of the liquid crystal panel 300 through the use of the backlight 200.

The liquid crystal panel 300 includes a plurality of pixel electrodes, and TFTs arranged at the intersections of a plurality of data and gate lines to form a TFT array and to function as switches. The TFTs are the switches that apply and shut off signal voltages to the pixel electrodes. The gate lines are connected to gate electrodes of the TFTs, the data lines are connected to source electrodes of the TFTs, and the pixel electrodes are connected to drain electrodes of the TFTs, so that signal voltages are applied to the liquid crystals through the pixel electrodes by switching action caused by signal voltages applied through the gate and data lines, thus displaying images.

That is, the liquid crystal panel 300 displays color images by controlling white planar light input from the backlight 200 and transmitted through pixels in response to pixel signal voltages input from the driver circuit 400.

Meanwhile, the driver circuit 400 is used to drive the liquid crystal panel 300. The construction and operation of the driver circuit 400 are described in detail below.

As illustrated in FIG. 2, the driver circuit 400 includes a Transmission Minimized Differential Signaling (TMDS) reception unit 410, a timing controller 420, a data driving unit 430, a gate driving unit 440, a power supply unit 450, a determination unit 460, and a switching unit 470. The TMDS reception unit 410 decodes TMDS data signals input from the outside to a horizontal or vertical synchronization signal and a digital image signal, and outputs the horizontal or vertical synchronization signal and the digital image signal. The timing controller 430 generates timing signals to drive the liquid crystal panel 300 in response to the horizontal or vertical synchronization signal transmitted from the TMDS reception unit 410. The data driving unit 430 feeds digital image signals to the data lines of the liquid crystal panel 300. The gate driving unit 440 applies scanning signals to the gate lines of the liquid crystal panel 300. The power supply unit 450 supplies power to the units of the LCD. The determination unit 460 determines whether the horizontal or vertical synchronization signals transmitted from the TMDS reception unit 410 are input, and performs a normal mode or power saving mode depending upon determination results. The switching unit 470 shuts off power to the data driving unit 430 and the gate driving unit 440 depending upon the determination results output from the determination unit 460.

When a graphic card embedded in the computer body codes the horizontal or vertical synchronization signal and the digital image signal to the TMDS data signal in a compressed manner using a TMDS conversion method and outputs the TMDS data signal along with a clock signal to the LCD 100, the TMDS reception unit 410 of the LCD 100 decodes the TMDS data signal input through the TMDS conversion method to the horizontal or vertical synchronization signal Hsync or Vsync and the digital image signal (RGB data) and outputs the horizontal or vertical synchronization signal Hsync or Vsync and the digital image signal (RGB data).

In the above-described case, the TMDS conversion method denotes the technology in which a transmission side modulates parallel data to high speed, serial data and transmits the high speed, serial data and a reception side receives and demodulates the high speed, serial data.

The timing controller 420 outputs timing signals C1 and C2 to the data driving unit 430 and the gate driving unit 440 in response to the horizontal or vertical synchronization signal Hsync or Vsync transmitted from the TMDS reception unit 410 so as to drive the LCD 300.

The data driving unit 430 is electrically connected to the plurality of gate lines formed on the liquid crystal panel 300, and feeds the digital image signal (RGB data) to the plurality of data lines of the liquid crystal panel 300 in synchronization with the horizontal synchronization signal input from the timing controller 420.

The gate driving unit 440 is electrically connected to a plurality of gate lines formed on the liquid crystal panel 300, sequentially generates gate pulses in synchronization with the vertical synchronization signal input from the timing controller 420, and feeds the generated gate pulses to the gate lines of the liquid crystal panel 300 so that the digital image signals input through the data lines are fed to the respective pixels.

The data driving unit 430 and the gate driving unit 440 are each composed of a plurality of driving Integrated Chips (ICs) required for the driving of the data and gate lines formed depending upon the resolution of the liquid crystal panel 300, and may be fabricated in the form of a TCP (Tape Carrier Package).

The power supply unit 450 receives commercial alternating current power from the outside and supplies power to the units of the LCD 100. Since the power supply unit 450 has the same construction and operation as those generally used in an LCD field, a detailed description of the construction and operation of the power supply unit 450 is omitted.

Meanwhile, the determination unit 460 determines whether the horizontal or vertical synchronization signals transmitted from the TMDS reception unit 410 are input, performs a normal mode or power saving mode depending upon determination results, and shuts off power applied to the liquid crystal panel 300 during the power saving mode, thus reducing power consumption during the power saving mode and satisfying the DPMS standard. The operation of the determination unit 460 is described in detail below.

The DPMS standard was developed to reduce the amount of power consumption of a display device by managing power depending upon whether the horizontal or vertical synchronization signals are input from the computer body, and provides four modes: a normal mode, a standby mode, a suspend mode and an off mode. The normal mode denotes the mode in which both of horizontal and vertical synchronization signals are input, the standby mode denotes the mode in which only a vertical synchronization signal is input, the suspend mode denotes the mode in which only a horizontal synchronization signal is input, and the off mode denotes the mode in which both of horizontal and vertical signals are not input.

In more detail, the determination unit 460 determines whether the horizontal or vertical signals transmitted from the TMDS reception unit 410 are input, performs the normal mode if both of the horizontal and vertical synchronization signals Hsync and Vsync are input, and performs a power saving mode (standby, suspend or off mode) if one or both of the horizontal and vertical synchronization signals are not input.

The reason why the determination unit 460 determines whether the horizontal or vertical synchronization signals Hsync or Vsync is input at the output end of the TMDS reception unit 410 is that it is difficult to determine whether the horizontal or vertical synchronization signals Hsync or Vsync are input using the TMDS data signal because the TMDS data signal has high frequency and small amplitude.

Thereafter, the determination unit 460 sets a Power Down Control (PDC) signal to a high level (for example, "1") if one or both of the horizontal and vertical synchronization signals are not input, or to a low level (for example, "0") if both of the horizontal and vertical synchronization signals are input, and outputs the set PDC signal to the timing controller 420 and the switching unit 470, so that power is shut off or supplied to the data driving unit 430 and the gate driving unit 440. The operation of the switching unit 470 is described in detail below.

The switching unit 470 supplies power to the data driving unit 430 and the gate driving unit 440 if a PDC signal of a low level ("0") is input from the determination unit 460, shuts off power to the data driving unit 430 and the gate driving unit 440 if a PDC signal of a high level ("1") is input from the determination unit 460, and resumes the supply of power to the data driving unit 430 and the gate driving unit 440 if a PDC signal of a low level ("0") is input from the determination unit 460.

The switching unit 470 is preferably implemented using a Metal-Oxide Semiconductor Field-Effect Transistor (MOSFET) having a small amount of power consumption and switching speed. The switching unit 470 may be implemented using switching devices other than the MOSFET.

Meanwhile, as described above, the conventional TFT-LCD monitor blanks a screen when an abnormal signal is input from a computer body. Since power is supplied to the liquid crystal panel during a blanking period, power is unnecessarily consumed. Accordingly, in order to reduce power consumption as much as possible, it is necessary to control the supply of power to the liquid crystal panel when abnormal signals are input to the TFT-LCD monitor.

To the end, the determination unit 460 determines whether the horizontal or vertical synchronization signals Hsync or Vsync are normal when determining whether the horizontal or vertical synchronization signals Hsync or Vsync are input, and shuts off power to the data driving unit 430 and the gate driving unit 440 through the switching unit 470 if it is determined that the horizontal or vertical synchronization signals Hsync or Vsync are abnormal. In this case, it can be determined by checking the periods of the signals and counting the numbers of clocks in specified ranges whether the horizontal or vertical synchronization signals Hsync or Vsync are normal. Further, it can be determined by other methods whether the horizontal or vertical synchronization signals Hsync or Vsync are normal.

That is, if the horizontal or vertical synchronization signals Hsync or Vsync are abnormal (for example, the TMDS data signal output from the computer body is abnormal, noise is included in the TMDS signal, or the pulse output of the horizontal or vertical synchronization signals become unstable), the determination unit 460 outputs a PDC signal of a high level "1" to the timing controller 420 and the switching unit 470 and shuts off power to the data driving unit 430 and the gate driving unit 440. Since the operation of the switching unit 470 has been described in detail above, a detailed description thereof is omitted.

In the meantime, when a PDC signal of a low level "0" is input from the determination unit 460, the timing controller 420 outputs timing signals C1 and C2 to the data driving unit 430 and the gate driving unit 440; when a PDC signal of a high level "1" is input, the timing controller 420 does not output timing signals C1 and C2 to the data driving unit 430 and the gate driving unit 440.

That is, the timing controller 420 holds digital image signals (RGB data) until the horizontal or vertical synchronization signals become normal, and outputs the digital image signals (RGB data) at the moment when it is determined that the horizontal and vertical synchronization signal are normal.

Meanwhile, the LCD 100 of the present invention may further include a power failure countermeasure circuit for protecting the driving circuit 400 from a power failure, and a RC circuit for eliminating noise included from the outside.

As described above, the digital interface type LCD of the present invention performs the power saving mode depending upon whether the horizontal or vertical synchronization signals are input and shuts off power to the liquid crystal panel, thus reducing power consumption during the power saving mode.

That is, the LCD of the present invention performs the power saving mode depending upon whether the horizontal or vertical synchronization signals are input and shuts off power to the liquid crystal panel, thus reducing power consumption during the power saving mode and satisfying DPMS standard.

Additionally, the LCD of the present invention has an effect in which unnecessary power consumption can be prevented by shutting off power to the liquid crystal panel when an abnormal signal is input from the outside.

Additionally, the LCD of the present invention can provide high quality digital images to users because signals do not undergo digital/analog conversion or analog/digital conversion, and can be small-sized, lightweight and inexpensive because it is not necessary to additionally install an ADC in the LCD.

Further, as all information is digitalized, it is expected that a digital LCD becomes popularzed. Since the LCD of the present invention can reduce power consumption while displaying high quality images, it is expected that the LCD of the present invention can be used in the various fields of applications.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A driver circuit for a liquid crystal panel, comprising:

a gate driving unit for applying signal voltages to gate lines of a liquid crystal panel;

a data driving unit for applying signal voltages to data lines of a liquid crystal panel;

a switching unit for transferring power to the data and gate driving units;

a timing controller for generating timing signals to drive the liquid crystal panel depending upon horizontal and vertical synchronization signals which are input from an outside; and a determination unit for determining whether either one of or both of the horizontal and vertical synchronization signals are input from the outside, and controlling the switching unit and the timing controller, and performing a normal mode or powersaving mode depending upon determination results.

2. The driver circuit as set forth in claim 1, wherein the determination unit outputs a Power Down Control (PDC) signal to the switching unit unless one of the horizontal and vertical synchronization signals is input.

3. The driver circuit as set forth in claim 1, wherein the determination unit outputs a PDC signal to the switching unit unless both of the horizontal and vertical synchronization signals are input.

4. The driver circuit as set forth in claim 1, wherein the determination unit further determines whether the horizontal or vertical synchronization signals are normal.

5. The driver circuit as set forth in claim 4, wherein the determination unit determines whether the horizontal or vertical synchronization signals are normal by checking periods of the horizontal or vertical synchronization signals or counting numbers of clocks in a specified range.

6. The driver circuit as set forth in claim 4, wherein the determination unit outputs a PDC signal to the switching unit if the horizontal or vertical synchronization signals are abnormal.

7. The driver circuit as set forth in claim 1, wherein the switching unit is a Metal-Oxide Semiconductor Field-Effect Transistor (MOSFET).

8. The driver circuit as set forth in claim 2, wherein the switching unit shuts off power to the data driving unit and the gate driving unit when the PDC signal is input from the determination unit.

9. The driver circuit as set forth in claim 1, further comprising a Transmission Minimized Differential Signaling (TMDS) reception unit for decoding a TMDS data signal input from an outside to a horizontal or vertical synchronization signal and a digital image signal and outputting the decoded horizontal or vertical synchronization signal and the decoded digital image signal.

10. The driver circuit as set forth in claim 1, wherein the timing controller holds the timing signal until the horizontal or vertical synchronization signal becomes normal.

11. A liquid crystal display comprising:

a backlight having a light source;

a liquid crystal panel on which a plurality of thin film transistors are formed on intersections of a plurality of data and gate lines; and a driver circuit for driving the liquid crystal panel, the driver circuit comprising:

a gate driving unit for applying signal voltages to gate lines of a liquid crystal panel;

a data driving unit for applying signal voltages to data lines of a liquid crystal panel;

a switching unit for transferring power to the data and gate driving units;

a timing controller for generating timing signals to drive the liquid crystal panel depending upon horizontal and vertical synchronization signals which are input from an outside; and a determination unit for determining whether either one of or both of the horizontal and vertical synchronization signals are input from the outside, and controlling the switching unit and the timing controller, and performing a normal mode or powersaving mode depending upon determination results.

12. The liquid crystal display as set forth in claim 11, wherein the determination unit outputs a PDC signal to the switching unit unless one of the horizontal and vertical synchronization signals is input.

13. The liquid crystal display as set forth in claim 11, wherein the determination unit outputs a PDC signal to the switching unit unless both of the horizontal and vertical synchronization signals are input.

14. The liquid crystal display as set forth in claim 11, wherein the determination unit further determines whether the horizontal or vertical synchronization signals are normal.

15. The liquid crystal display as set forth in claim 14, wherein the determination unit determines whether the horizontal or vertical synchronization signals are normal by checking periods of the horizontal or vertical synchronization signals or counting numbers of clocks in specified ranges.

16. The liquid crystal display as set forth in claim 14, wherein the determination unit outputs a PDC signal to the switching unit if the horizontal or vertical synchronization signals are abnormal.

17. The liquid crystal display as set forth in claim 11, wherein the switching unit is a MOSFET.

18. The liquid crystal display as set forth in claim 12, wherein the switching unit shuts off power to the data driving unit and the gate driving unit when the PDC signal is input from the determination unit.

19. The liquid crystal display as set forth in claim 11, further comprising a TMDS reception unit for decoding a TMDS data signal input from an outside to a horizontal or vertical synchronization signal and a digital image signal and outputting the decoded horizontal or vertical synchronization signal and the decoded digital image signal.

20. The liquid crystal display as set forth in claim 11, wherein the timing controller holds the timing signal until the horizontal or vertical synchronization signal becomes normal.

21. The driver circuit as set forth in claim 3, wherein the switching unit shuts off power to the data driving unit and the gate driving unit when the PDC signal is input from the determination unit.

22. The driver circuit as set forth in claim 6, wherein the switching unit shuts off power to the data driving unit and the gate driving unit when the PDC signal is input from the determination unit.

23. The liquid crystal display as set forth in claim 13, wherein the switching unit shuts off power to the data driving unit and the gate driving unit when the PDC signal is input from the determination unit.

24. The liquid crystal display as set forth in claim 16, wherein the switching unit shuts off power to the data driving unit and the gate driving unit when the PDC signal is input from the determination unit.

* * * * *